Dec. 19, 1950  W. R. MOSS  2,534,291
PROCESS FOR FORMING THERMOPLASTIC SHEETING
Filed Feb. 26, 1948
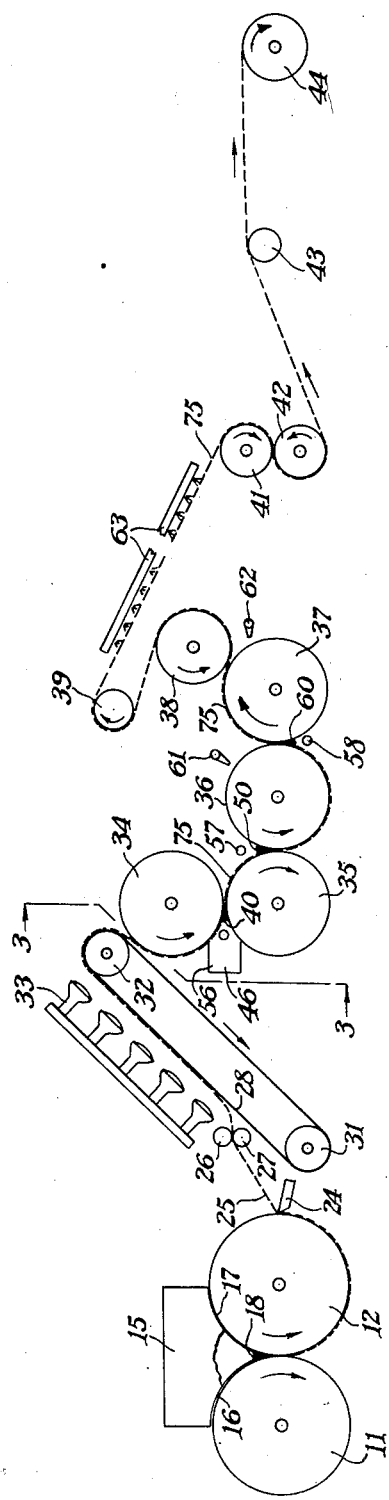
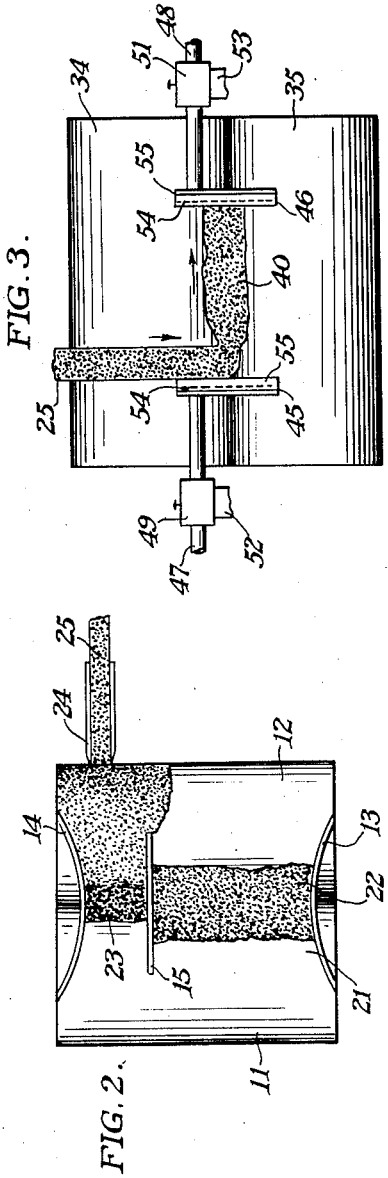
WILLIAM R. MOSS
INVENTOR
BY
ATTORNEYS Patented Dec. 19, 1950

2,534,291

UNITED STATES PATENT OFFICE 2,534,291

PROCESS FOR FORMING THERMOPLASTIC SHEETING

William R. Moss, Kingsport, Tenn., assignor to Eastman Kodak Company, Rochester, N. Y., a corporation of New Jersey Application February 26, 1948, Serial No. 11,202

7 Claims. (Cl. 18—55)

This invention relates to the production of thermoplastic sheeting and more particularly to a continuous process of forming transparent thermoplastic sheeting of predetermined dimensions and improved characteristics.

Various methods have been heretofore employed to form thermoplastic compositions into continuous thin sheeting. The early methods for making cellulose ester type sheets cast the continuous sheet by flowing a solution of the cellulose ester onto a slowly revolving roll or endless belt and evaporating the solvent and other volatiles therefrom in a heated, controlled atmosphere. For many years this general method has been successfully employed in the manufacture of so-called film base for photographic films, the film base being subsequently coated with suitable photosensitive emulsions and other associated coatings. A film base of excellent clarity and generally superior optical properties is obtained by this casting method.

Continuous thermoplastic sheets have also been formed by continuously extruding a suitable composition through a die. The composition is heated to plasticity before extrusion and the extruded sheet cooled thereafter. The extrusion process has thus far never produced a continuous sheet on a commercial scale which was satisfactory enough from an optical standpoint to cause the photographic industry to adopt this less expensive and relatively easier sheet manufacturing method. Many such extruded sheets have been employed as transparent packaging materials or even as the safety innerlayer in safety glass. However, there are defects in the extruded sheet which cause image distortions and the sheet is readily seen to be inferior to that made by the casting process. These defects include bubbles within the sheet which are caused by various factors and longitudinal streaks on the surface of the sheet often due to irregularities in the extrusion die orifice.

Another method of forming continuous thermoplastic sheeting is to employ a multiple roll calendar device through which an unshaped mass of thermoplastic composition is rolled progressively down into a sheet of a desired thickness. This method also produces sheets satisfactory for many uses but these sheets often contain too many bubbles to permit good light transfer through the sheet.

An object is a method of forming continuous thermoplastic sheeting either transparent, translucent, or opaque, from uncolloidized composition mixtures, as contrasted to the former methods requiring solutions or colloidized granules, particles or pellets of the composition.

Another object is to provide a method for producing sheeting of the class described in a more rapid and simple manner.

Still another object is to provide a method for producing either thick or thin sheeting which is substantially free from bubbles.

Yet another object is an improved method of producing transparent thermoplastic sheeting on calender rolls whereby bubbles and imperfections in the sheeting are eliminated. Other objects will appear hereinafter.

In accordance with the invention these and other objects are attained by a new process comprising several novel features in combination. The process contemplates in the first place the continuous colloidization by heat and pressure of uncolloidized potentially thermoplastic mixtures such as, for example, cellulose ester and plasticizer on temperature controlled milling rolls under conditions so that more occluded air will be forced out of the plastic mass on the rolls than will be occluded in the plastic during the colloidizing procedure. This is achieved by regulating the size of the bead of plastic which forms between the rolls as they rotate toward each other. Without regulation the bead normally becomes large enough to churn over on itself and to entrap air within its convolutions. By controlling the bead size, i. e., making it considerably smaller than the bead normally formed without control less air is entrapped in the bead and the material in the bead receives more milling per unit time and hence more air is squeezed out of the plastic than usual. This feature permits the continuous production of colloidized plastics having an occluded air content much less than has heretofore been attainable when employing prior art milling roll techniques for continuously colloidizing plastic mixtures.

A constant amount of material being added to the input end of the milling rolls permits a similar constant amount to be removed in a narrow thin strip from the opposite end of the hotter roll. The colloidized plastic mass works along and around rolls from the input end to the strip take-off point.

In accordance with another feature of the invention, the hot narrow strip of colloidized material is removed continuously from the roll and conducted on an endless belt to a multiple roll calender device. As the strip moves along on the endless belt it is externally heated by radiant heat to prevent it cooling below its plasticity temperature. Under these conditions it does not tend to occlude air. The narrow strip is fed to the bite between the first and second roll in the calender roll train.

In accordance with another feature of the process, means is provided adjacent the bite of the first and second calender rolls to limit adjustably the width of the bead of plastic which is formed from the narrower strip. Hence, the sheet issuing from the other side will be within a predetermined width and in proportion to the width of the controlled bead. By proper regulation of distance between the rolls coupled with individual control of the rate of revolution of the rolls and regulation of the amount of material fed thereto, a hot, small bead of plastic material is maintained at the nip of the first and second rolls and at the nip of the second and third rolls and also at the nip of the third and fourth rolls. These beads of plastic are kept at a high temperature by radiant heaters placed thereover so that the external surface of the beads are not cooled by the surrounding atmosphere below the temperature of the portion of the bead coming in contact with the hot calender rolls. Because the beads are kept small they do not have a tendency to pick up air and on the contrary air will be squeezed out of the bead. The second and third beads should be as wide as the sheet and in direct proportion to the width of the first bead. Preferably the successive calender beads have a diameter less than the preceding calender bead. The calender rolls are internally heated and may be differentially rotated to allow for increase in length of the calendered sheet if the sheet is to be thicker or thinner than that passing through the first pair of rolls. They have a plated, mirror-like rolling surface.

The employment of externally positioned bead heaters is a very important feature in this novel process. They maintain the material in an extremely plastic or semi-molten form and prevent even momentary hardening or crusting over on the upper bead surface. Were the calender rolls maintained at a temperature high enough to eliminate this difficulty, it would be impossible to remove the plastic from the rolls since it would adhere thereto. On leaving the calender rolls, the continuous sheet is cooled by being passed around cold rolls and through a cold water spray and wound up in a packaging roll. Because the spray is kept very fine and the sheet is relatively hot, the water will be completely evaporated from the sheet by the time it reaches the wind up roll.

The invention will be more clearly understood by reference to the following detailed description and drawings in which:

Fig. 1 is a diagrammatic elevational view of the preferred apparatus, portions being in section, on which can be conducted a process for forming an uncolloidized mixture of a cellulose organic acid ester and plasticizer into a continuous thermoplastic sheet.

Fig. 2 is a plan view of the milling rolls showing the maintenance of a large and small bead of plastic on those rolls, and Fig. 3 is a front elevation view of the first pair of calender rolls taken on the line 3—3 of Fig. 1 and particularly showing the horizontally adjustable plates for determining the width of the plastic bead formed between these calender rolls.

The process of the invention is described with particular reference to plasticized cellulose acetate plastics but the process is equally applicable to the continuous production of continuous sheeting from any of the various cellulose organic derivatives such as cellulose propionate, cellulose butyrate, cellulose acetate propionate, cellulose acetate butyrate, methyl ether, ethyl ether, benzyl ether and the like.

The cellulose acetate and plasticizer is first mixed in a suitable mixer. Various types of mixers may be employed and one may use the type of mixer and, if applicable, the method described in Palmer Patent 2,150,939 of March 21, 1939.

After thoroughly mixing the cellulose acetate and plasticizer the mixture is continuously added in controlled amounts to the apparatus shown in Fig. 1. The apparatus and its process of operation will now be described. This apparatus at the input end comprises a pair of coacting temperature controlled milling rolls 11 and 12 which are rotated by means, not shown, in opposite directions, as shown by the arrows on the drawing. In milling cellulose ester plastics these rolls are maintained within a range of approximately 212° F. to 370° F. by conventional means. The temperature of roll 12 is maintained higher than the other roll 11 so that the composition which becomes colloidized by the heating and rolling will gradually collect thereon.

As more clearly shown in Fig. 2, the mixture is restricted in movement along the rolls by a pair of end plates 13 and 14 which are placed above the rolls in perpendicular relationship therewith. They have arcuate sections, not shown, closely fitted to the peripheral surfaces of the rolls to prevent plastic material from flowing off the ends of the rolls. The rolls are divided longitudinally into two operating sections by a metering member 15 which may also be called a bead size regulating member. Member 15 is positioned above the rolls 11 and 12 and is adapted by means, not shown, to be lowered and raised in a vertical plane in respect to the rolls or moved longitudinally in respect to the rolls, so that the working surface of the rolls can be divided into equal or unequal sections as desired. As shown in Fig. 1, member 15 has arcuate sections 16 and 17 which are concentric with the periphery of rolls 11 and 12. A metering space 18 is formed between the apex of member 15 and the bite of rolls 11 and 12. This arrangement permits a restricted and predetermined amount of colloidized or semi-colloidized plastic to flow through the metering space 18. The mixture is continuously added by means not shown to the space 21 defined by members 13 and 15. As the material passes between the heated rolls a relatively large bead 22 will be formed on the rolls above their convergence and on this bead will rest the freshly added uncolloidized mixture and which will gradually work into the bead. Generally the large bead will have a rough diameter of 8 to 12 inches. The large bead tends to churn over and over and pick up and occlude myriads of air bubbles many of which heretofore would appear in the final product. The continuous addition of more uncolloidized plastic will soon cause some of the colloidized or partially colloidized plastic to be squeezed through space 18 and work along and around the hot front roll 11 to the opposite end where it is continuously removed by the stripping knife 24.

Because the flow of partially colloidized plastic is from the large bead through the metering space 18, a relatively small bead 23 is maintained within predetermined limits which causes the plastic to be more thoroughly mixed, heated and colloidized. As previously explained, since the bead is small in diameter it does not occlude air in such proportions as does the larger diameter bead. The small bead is generally about ½ to ¼ the diameter of the large bead. This rolling action of the small bead squeezes out substantially all of the air which may have been occluded up to this point in the mixture and, therefore, the hot strip of plastic 25 being removed from the knife 24 is substantially free of air bubbles.

The strip 25 of hot colloidized plastic is taken away from the knife 24 by the pair of rolls 26 and 27 which can be heated or cooled, if desired, and is conducted to endless conveyor belt 28 which revolves around drums 31 and 32, one or both of which may be driven, if desired, by a suitable source of power, not shown. A bank of infra red lamps 33 is positioned above the conveyor belt for the purpose of maintaining the temperature of strip 25 within a desired temperature range generally approximating the temperature of the milling rolls.

The strip 25 on leaving conveyor belt 28 is permitted to follow the periphery of the first roll 34 of a plurality of associated heated calender rolls 34, 35, 36 and 37. These rolls may be internally heated by any conventional means such as by electric or steam heat. Calender roll 38 is normally operated at much lower temperatures than the other rolls and cooling or heating means may be associated therewith. The strip 25 thus is conducted to the nip between the rolls 34 and 35. As shown in the drawings, these rolls are vertically mounted and, as shown in Fig. 3, the narrow strip 25 after reaching the bite of these rolls is permitted to spread out and to form a bead 40 between adjustable plates 45 and 46. These plates 45 and 46 are mounted on respective rods 47 and 48 which are respectively retained in adjustable position by collars 49 and 51 which are attached to the frame work of the apparatus, not shown, by respective members 52 and 53. As shown in Fig. 3, the plates 45 and 46 are positioned equidistantly from the ends of the rolls 34 and 35 and the bead being restricted therebetween causes the calenders to form a sheet 75 having a width in proportion to the distance between the plates 45 and 46. To prevent the hot bead of plastic from cooling at the surfaces of the adjustable plates, the plates are heated by electric heaters 54 positioned within the plates. To prevent localized heating of the adjacent surfaces of the calender rolls, the plates and heaters are recessed into a heat insulating material 55 such as fiber board. The plates 45 and 46 have arcuate sections not shown which are so closely positioned on the rolls that no plastic flows underneath the two plates but is retained in the space between them.

To prevent the upper surface of the bead from cooling a radiant heater 56 is positioned above the bead and across its width. Similar heaters 57 and 58 are positioned adjacent beads 59 and 60 as is subsequently described.

The sheet 75 after emerging from the nip between calender rolls 34 and 35 follows the periphery of roll 35 and enters the nip between calender rolls 35 and 36 and again is permitted to form a bead 59 between these rolls, the sheet 75 is again reformed by calender rolls 35 and 36 and follows the lower periphery of calender roll 36 to the nip between calender rolls 36 and 37. Here again the sheet 75 is permitted to form a bead 60 and is then reformed into sheet 75 and follows the upper periphery of calender roll 37 and is finally calendered and given a surface polish by calender rolls 37 and 38. Compressed air is directed from air jets 61 and 62 onto respective rolls 36 and 37 in order to assist the sheet in leaving these rolls. The sheet is passed over guide roll 39 and over driven roll 41 and between driven rolls 41 and 42 which act as pull-off rolls in the apparatus and thence over guide roll 43 to wind-up roll 44.

Between rolls 39 and 41 is placed a water spray jet 63 which sprays cold water onto the sheet 75 passing thereunder. This further cools the sheet and by proper regulation the water on the sheet will completely evaporate before the sheet is rolled up.

It will be understood, of course, that this apparatus for forming calendered sheets of thermoplastic material may be made of various sizes to accommodate the production of sheeting of varying widths and thicknesses.

The following examples illustrate the production of sheeting on equipment of practical size.

*Example 1*

To produce 500 feet of cellulose acetate base sheeting of a thickness of .020" and a width of 20", 150 pounds of an uncolloidized homogeneous mixture containing 100 parts of cellulose acetate powder to 31 parts of glyceryl tripropionate plasticizer is continuously fed onto the milling rolls 11 and 12 as shown in Figs. 1 and 2. These rolls were 42 inches long and 16 inches in diameter.

The milling rolls were operated as shown in the following table:

| Milling Rolls | Temp. | Rate |
| --- | --- | --- |
|  | °F. | Feet per minute |
| Back #11 | 320 | 99.5 |
| Front #12 | 325 | 99.5 |

The mill is equipped with the bead regulating plate 15 about ⅔ down the roll towards the discharge end of the roll.

A large bead of colloidized plastic is maintained on the ⅔ portion and by means of the bead control plate a small bead about two inches in diameter exists above the nip of the rolls at the material take off end. The small bead aids considerably in the elimination of bubbles of air from the plastic. This is because the small bead entraps less air during milling than does a large bead and because the plastic receives more milling than in the case of a large bead operation.

A strip 25 of the colloidized plastic is cut off roll 12 by knife 24 and is fed through pull out rolls 26 and 27, and continuously fed onto endless belt 28 which conveys the soft strip under a bank of infra-red lamps 33 which are adjusted to maintain the temperature of the sheet approximately at 320° F. to the top of the first calender roll 34. The plastic is fed onto calender roll 34 in a strip about 1 inch wide by ¼ inch thick at a rate of 99.5 ft. per minute and is made to progress through the machine from one roll to the next by an increasing progression of roll speeds and temperatures as shown in the following table:

| Calender Rolls | Temp. | Rate |
| --- | --- | --- |
|  | °F. | Feet per minute |
| #34 | 320 | 22.9 |
| #35 | 325 | 34.4 |
| #36 | 328 | 51.5 |
| #37 | 340 | 60.1 |
| #38 | 52 | 100 |

The opening between rolls is set so as to maintain a bead about 3" in diameter at the nip between rolls 34 and 35, ½" in diameter at the nip between rolls 35 and 36 and 37 and 38. In order to keep these beads from marking the sheet they are kept in a hot plastic state by means of radiant heat directed on them from heaters 56, 57 and 58. Sufficient heat is imparted to the beads to keep them at a temperature corresponding to the temperature of the adjacent calender rolls. These controlled sized beads further remove bubbles from the sheet in the manner described above.

The width of the sheet is controlled by several factors. It is first controlled by confining the bead between adjustable, electrically heated plates 45 and 46 at the nip of rolls 34 and 35. These plates are heated to a temperature approximating that of the adjacent calender rolls. The opening between these rolls further controls the width of the sheet in that it forces the material out wider. The increased rate of rotation of the calender rolls aids in controlling the decreasing size of the beads.

The final thickness of the sheet as it leaves the calender is controlled by the opening between rolls 36 and 37. The sheet then passes around a water cooled roll 38 over a guide roll and through a set of tension rolls 41 and 42 onto a windup roll 44. The cooling roll is located over calender roll 37 with its center line on about a 60° angle. It is set just far enough off calender roll 37 so that the sheet can not be worked on by both calender rolls at the same time. If the roll is closer than this a wavy effect is produced on the sheet. The sheet 75 is further cooled by the water spray from a spray device 63.

The sheet is stretched some as it cools so that the final thickness of the sheet is dependent on this amount of stretching. Temperatures and speeds are run at such values as to hold the stretch to a minimum. It is this stretch that accounts for the increase in speed from calender roll 37 to the tension roll 38.

Compressed air is directed across the face of calender rolls 36 and 37 at the line where the sheet leaves the roll in an effort to help the sheet in coming off. The air may be conveyed in a ⅜" pipe with about 3/32" holes at about ½" centers. Since the air is approximately room temperature and the sheet is at an elevated temperature, the air will cause the sheet to cool.

A sheet averaging .020" thick by 22" wide was produced at the rate of 91 feet per minute. This sheet was of good transparency and contained a negligible bubble content. It can be satisfactorily employed as a film base for a photographic film.

*Example 2*

A continuous sheet composed of 100 parts of cellulose acetate butyrate to 41 parts of methoxy ethyl stearate plasticizer was made according to the general details of the process of Example 1 excepting the following specifications were used.

| Rolls | Temp. | Rate |
| --- | --- | --- |
|  | °F. | Feet per minute |
| Back Roll #11 | 265 | 99.5 |
| Front Roll #12 | 267 | 99.5 |
| Tension Roll #39 |  | 100 |
| Calender Roll #34 | 280 | 17.2 |
| Calender Roll #35 | 283 | 34.4 |
| Calender Roll #36 | 292 | 40.6 |
| Calender Roll #37 | 295 | 60.1 |
| Cooling Roll #38 | 52 | 100 |

The strip fed to the calender was about 1" wide by 1/16" thick and ran at a rate of 99.5 feet per minute. A continuous sheet of the above specified composition .015" thick by 12" wide was produced at a rate of 100 feet per minute. This sheet was of good transparency and contained a negligible number of air bubbles. It is of a grade comparable with cast film base.

*Example 3*

A continuous sheet composed of 100 parts of cellulose acetate and 32 parts ethyl phthalate plasticizer was made according to the general details of the process of Example 1, the following specifications being employed:

| Rolls | Temp. | Rate |
| --- | --- | --- |
|  | °F. | Feet per minute |
| Back Roll #11 | 320 | 99.5 |
| Front Roll #12 | 325 | 99.5 |
| Tension Roll #39 |  | 73.0 |
| Calender Roll #34 | 320 | 22.9 |
| Calender Roll #35 | 325 | 34.4 |
| Calender Roll #36 | 338 | 51.5 |
| Calender Roll #37 | 340 | 60.1 |
| Cooling Roll #38 | 52 | 64.2 |

The strip fed to the calender was about 1" wide by ¼" thick and ran at a rate of 99.5 feet per minute. A continuous sheet .017" thick by 19" wide was produced at a rate of 73 feet per minute.

By my improved process a transparent thermoplastic sheet of uniform thickness which is substantially free from bubbles may be continuously made. The process is applicable for preparing translucent sheeting, colored sheeting or opaque sheeting in which it is desired that the air bubble content be eliminated. In such cases suitable dyes, pigments or filling materials may be added to the compositions shown in the above examples. The sheeting produced by my process may be pressed polished between heated surfaces to further improve its dimensions and optical clarity by methods known in the art.

In the above examples the production of a sheet by progressively rolling down a plastic mass into a thin sheet is described. However, by operating the successive calender rolls at progressively lesser speeds and with progressively greater spacing therebetween, a thicker sheet can be produced.

I claim:

1. The process of continuously forming a transparent thermoplastic sheet containing substantially no bubbles which comprises continuously adding a colloidizable mixture of material to a pair of differentially heated rotating milling rolls and colloidizing the mixture thereon, forming a relatively large diameter bead of colloidized plastic at the convergence of the rolls adjacent a section where the mixture is added and also conducting the colloidizing at a second section thereof while maintaining a second smaller diameter bead of plastic at the convergence of the rolls in said second section; continuously removing a strip of the colloidized material from that on the second section; maintaining the temperature of the strip approximately that of the hotter milling roll, hot calendering the material in the strip between adjacent coacting pairs of calender rolls to form a sheet, maintaining a small uniformly heated bead of material from the sheet at the nip of each pair of coacting calender rolls and cooling the sheet after it leaves the last coacting pair of calender rolls.

2. The process of continuously forming a cellulose organic acid ester thermoplastic sheet containing substantially no occluded gas in the form of bubbles which comprises continuously adding a colloidizable mixture to a pair of differentially heated rotating milling rolls and colloidizing the mixture thereon, forming a relatively large diameter bead of colloidized plastic at the convergence of the rolls adjacent a section where the mixture is added and also conducting the colloidizing at a second section thereof while maintaining a second smaller diameter bead of plastic at the convergence of the rolls in said second section; continuously removing a narrow strip of the colloidized material from that on the second section; maintaining the temperature of the strip approximately that of the hotter milling roll by radiant heat, hot calendering the material in the strip between a plurality of adjacent coacting calender rolls to form a sheet, maintaining a small bead of material from the sheet between each pair of adjacent coacting calender rolls, heating the outer surface of these calender beads by radiant heat to a temperature equivalent to that of the calender rolls adjacent the respective beads, and cooling the sheet after it leaves the last pair of calender rolls.

3. The process of continuously forming a cellulose organic acid ester thermoplastic sheet containing substantially no occluded air in the form of bubbles which comprises continuously adding a colloidizable mixture to a pair of differentially heated rotating milling rolls and colloidizing the mixture thereon, forming a relatively large diameter bead of colloidized plastic at the convergence of the rolls adjacent a section where the mixture is added and also conducting the colloidizing at a second section thereof while maintaining a second smaller diameter bead of plastic at the convergence of the rolls in said second section, continuously removing a narrow strip of the colloidized material from that on the second section; maintaining the temperature of the strip approximately that of the hotter milling roll by radiant heat, permitting the strip to form a bead of restricted width at the bite of the first pair of a plurality of adjacent coacting calender rolls, said bead being wider than said strip, and then calendering the bead into a sheet of predetermined width and thickness, forming an additional small bead from this sheet at the bite of the next pair of calender rolls and then calendering this bead into a sheet, repeating the bead and sheet forming steps at each succeeding pair of coacting calender rolls, while maintaining the temperature of said beads and sheets approximately that of the adjacent rolls, and cooling the sheet after it leaves the last pair of heated coacting calender rolls.

4. The process of claim 3 in which the mixture to be formed into a continuous sheet consists of a ratio of 100 parts of cellulose acetate to 31 parts of glyceryl tripropionate plasticizer.

5. The process of claim 3 in which the mixture to be formed into a continuous sheet consists of a ratio of 100 parts of cellulose acetate butyrate to 41 parts methoxy ethyl stearate plasticizer.

6. The process of claim 3 in which the mixture to be formed into a continuous sheet consists of a ratio of 100 parts of cellulose acetate to 32 parts ethyl phthalate plasticizer.

7. The process of continuously forming a transparent cellulose organic acid ester thermoplastic sheet containing substantially no occluded air in the form of bubbles which comprises continuously adding a colloidizable mixture of material to a pair of differentially heated rotating milling rolls and colloidizing the mixture to a transparent palstic mass thereon, forming a relatively large diameter bead of colloidized plastic at the convergence of the rolls adjacent a section where the mixture is added and also conducting the colloidizing at a second section thereof while maintaining a second smaller diameter bead of plastic at the convergence of the rolls in said second section, the second bead having a diameter $\frac{1}{2}$ to $\frac{1}{4}$ as great as the large bead; continuously removing a strip of the colloidized material from that on the second section; maintaining the temperature of the strip approximately that of the hotter milling roll, hot calendering the material in the strip between the first pair of adjacent coacting pairs of calender rolls to form a sheet, maintaining a small uniformly heated bead of material from the sheet between each pair of coacting calender rolls and spraying the hot sheet after it leaves the last pair of calender rolls with water to cool it.

WILLIAM R. MOSS.

REFERENCES CITED

The following references are of record in the file of this patent:

UNITED STATES PATENTS

| Number | Name | Date |
| --- | --- | --- |
| 768,891 | Ackerman | Aug. 30, 1904 |
| 1,743,302 | Allen | Jan. 14, 1930 |
| 1,751,116 | Welton | Mar. 18, 1930 |
| 2,067,025 | Schmidt | Jan. 5, 1937 |
| 2,326,927 | Conrad | Aug. 17, 1943 |